I. W. LITTLE.
ATTACHABLE TWO-WAY OUTLET FOR HOT AND COLD WATER FAUCETS.
APPLICATION FILED MAY 1, 1911.
1,146,804.
Patented July 20, 1915.
2 SHEETS—SHEET 1.
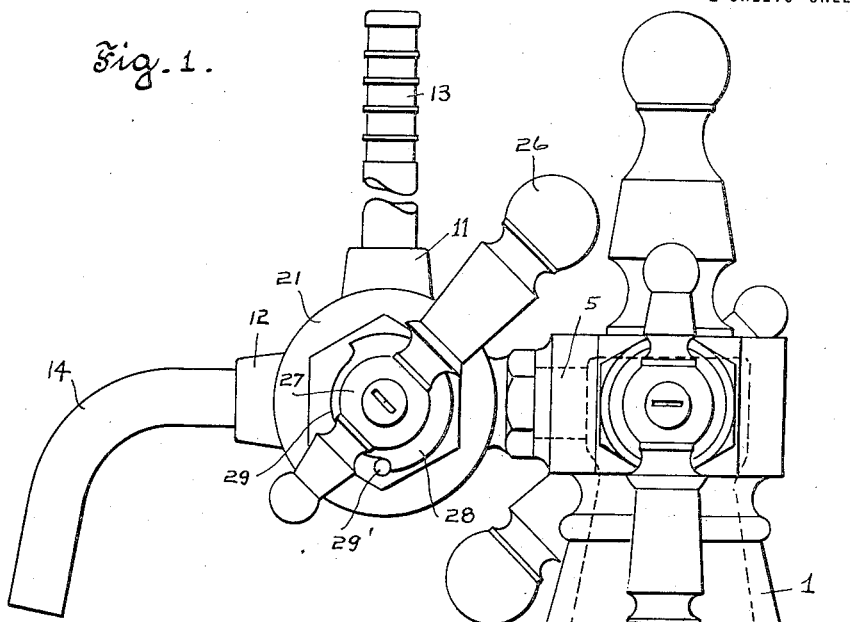
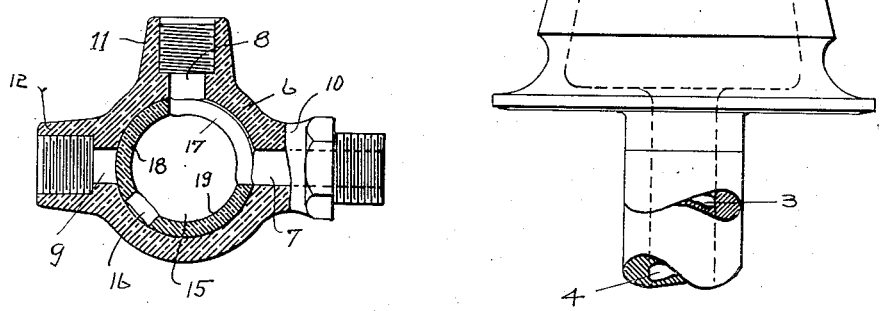
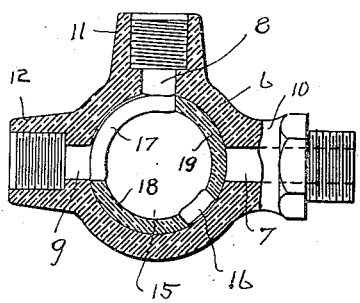
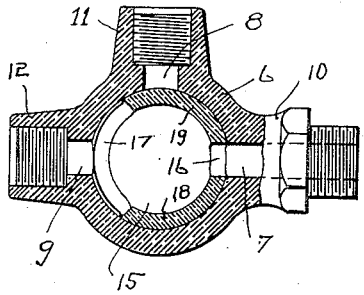
Witnesses
Leo H Semick
Johanna Weiher
Inventor
Irving W. Little
By Herman H. Martin
Attorney

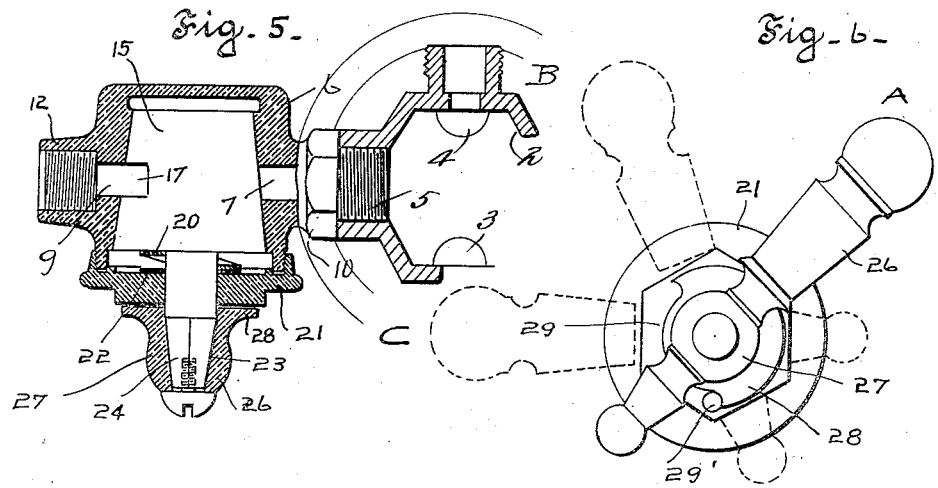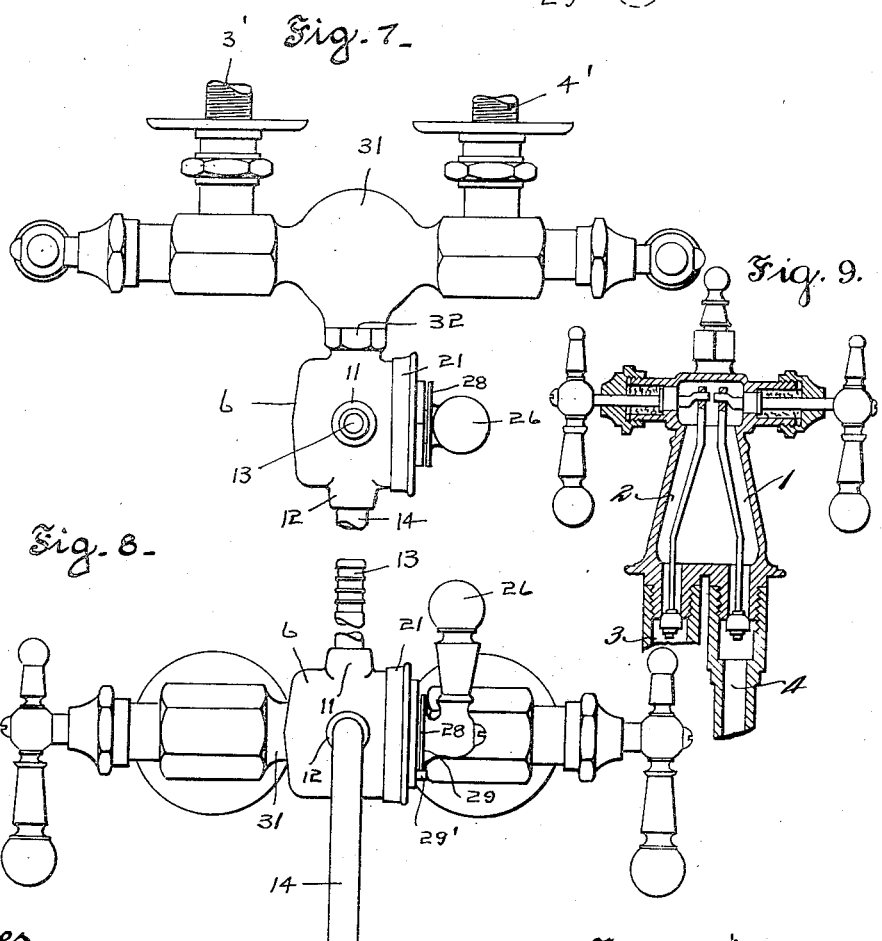

UNITED STATES PATENT OFFICE.

IRVING W. LITTLE, OF TOLEDO, OHIO.

ATTACHABLE TWO-WAY OUTLET FOR HOT AND COLD WATER FAUCETS.

1,146,804.   Specification of Letters Patent.   Patented July 20, 1915.

Application filed May 1, 1911. Serial No. 624,435.

*To all whom it may concern:*

Be it known that I, IRVING W. LITTLE, a citizen of the United States, residing at Toledo, in the county of Lucas and State of Ohio, have invented a new and useful Attachable Two-Way Outlet for Hot and Cold Water Faucets, of which the following is a specification.

My invention relates to plumbing fixtures of the kind having a mixing chamber common to valved supply pipes of respectively hot and cold water, and has for its object to provide a two-way-outlet from the mixing chamber of such plumbing fixtures, said two-way-outlet being attachable to the mixing chamber in place of the usual single outlet and is provided with a valve, which is so ported, that by turning of the valve to defined positions, water from the mixing chamber may be discharged through one or the other of the two outlets of the attachment, being also adapted to cut off the outflow of water from both of said outlets, and to effect drainage of the outlets, when placed to cut off the supply of water from the mixing chamber.

The objects of my invention are accomplished as hereinafter described and illustrated in the drawings in which, Figure 1, is a side elevation of a pedestal hot and cold water faucet, showing my two-way-outlet in place of the usual single outlet. Fig. 2, is a vertical section through my two-way-outlet, showing the valve ports disposed to permit the discharge of water through the vertical outlet. Fig. 3, is also a like section showing the valve ports disposed to effect drainage of the outlet ports and showing the inlet closed. Fig. 4, is a like section, but showing the ports of the valve so placed as to permit the outflow of water through the lateral outlet. Fig. 5, is a horizontal section of my two-way-outlet showing the valve in elevation and the valve-body partly in elevation. Fig. 6 is a side elevation of my attachment showing the various positions of the valve handle, with reference to positions of the valve ports shown in Figs. 2, 3 and 4. Fig. 7, is a top plan view showing my two-way-outlet attached to a bath-tub fixture, Fig. 8, is a front elevation of both, the bath-tub fixture and my two-way-outlet, and Fig. 9, is a vertical section through the pedestal showing the hot and cold water inlet valves.

The plumbing fixture shown in Fig. 1 of the drawings is the usual pedestal style and comprises the pedestal 1, the interior of which serves for a mixing or tempering chamber 2, for hot and cold water supplied thereto through the valve controlled supply pipes 3 and 4 respectively. The mixing chamber has a side outlet port 5, which is internally threaded for attachment of a basin outlet.

My two-way-outlet is adapted to replace the single basin outlet, and comprises a valve housing 6, having an inlet port 7, and outlet-ports 8 and 9. The outlet port 8 is disposed in vertical relation to the inlet port and the outlet-port 9 is shown as arranged diametrically opposite the inlet port of the valve housing.

The inlet port 7 is formed in a boss 10 integral with the housing, and has a threaded nipple for attachment of the housing to the inlet port 5 of the pedestal, and when the valve housing is thus attached, the outlet-port 8 is located in the vertical position. The valve housing has also integral bosses 11 and 12 in which the outlet-ports 8 and 9 are respectively located, said ports being partly threaded to permit coupling thereto of respectively the shampoo outlet 13 and the basin outlet 14. The shampoo outlet 13 comprises a tubular section, serrated to clench hose-connections, not shown.

The interior of the valve housing is bored to seat a truncated valve-body 15, which by reason of it tapering, is self-seating within the housing. The valve body is preferably made hollow and has a port 16. This port has an area equal to the inlet-port 7. The valve-body is further provided with a slot like port 17, which has a width equal to the diameter of the outlet-ports 8 and 9 and is of a length to connect the said outlet-ports and as arranged in my valve-body, the port 16 is disposed diametrically opposite the center of the slot-like port 17. By thus arranging the valve-ports, there are formed closure-laps 18 and 19, which separate the ports of the valve body. The valve-body is spring-pressed into the valve bore by means of a spring 20, which is interposed between the base of the valve cone and a cover plate 21. Said cover-plate is thread-coupled to the valve-housing, and a rotatable washer 22 is placed against its inner side to receive the thrust of the spring 20. The washer and the cover are each provided with a central bore to permit the projection of the valve stem 23 to the outside of the cover-plate. The valve-stem is preferably integral with the body of the valve and its outer end 24 is squared for the attachment of the handle 26. The coupling portion 27 of the handle is provided with a disk-like flange 28, the rim of which is provided with incut 29. The respective ends of said incut are adapted to contact with a stop-pin 29' which is fixed to the cover-plate, the legnth of the incut being such as to permit movement of the handle in the arc length shown in Fig. 6.

When the handle is in the position A shown in Fig. 6, the valve-port 16 is away from the inlet port 7, the outlet port 9 is covered by the lap 18, and the lap 19 is under the area of the inlet-port 7, thus disposing the slot-like port 17 to establish a passage from the inlet-port 7 to the outlet-port 8. When the handle is turned to B, the lap 19 covers the inlet 7, cutting off the supply of water from the mixing chamber of the fixture. In this position the valve port 17 permits draining of the top outlet 8 through the basin outlet port 9. When the handle is brought to C, the vertical outlet 8 is closed by the lap 19 and through-flow of water is permitted through the valve ports 16 and 17 to the outlet port 9.

The advantages of my two-way valve consist in that the hot and cold water valves may be adjusted to the required temperature of water and the outflow of it controlled by means of my valve 15, and that by providing a two-way-outlet, one of the outlets may be permanently equipped with a shampoo attachment or a fountain-brush attachment drainable of its contents after the supply of water is cut off by the moving of my valve into the position B, which position also cuts off the outlet of water from the mixing chamber of the fixture. My two-way-outlet attachment is also applicable to bath-tub fixtures by providing its mixing tube 31, with a boss or a tapped port 32, to which the valve housing may be coupled by its nipple as shown in Figs. 7 and 8.

What I claim is—

1. A two-way outlet for plumbing fixtures comprising a mixing chamber provided with an outlet-port and valved supply pipes respectively for hot and cold water, a valve housing having an inlet-port nipple for coupling the housing to the outlet port from said mixing chamber, said valve housing being also provided with an outlet-port disposed in a horizontal plane and with an outlet port disposed in a vertical plane, a hollow valve body within said housing provided with two diametrically opposite ports, said valve body ports differing in length and being separated on opposite sides by equal valve body portions, said valve body being rotatable in said housing to close the inlet port or to bring the inlet port into communication with either of said outlet ports of the valve-housing and to close the other outlet port.

2. A two-way outlet for plumbing fixtures comprising a mixing chamber provided with an outlet port and valved supply pipes respectively for hot and cold water, a valve housing having an inlet port nipple for coupling the housing to the outlet port from said mixing chamber, said valve housing being also provided with an outlet port disposed in a horizontal plane and with an outlet port disposed in a vertical plane, a hollow valve-body within said housing, provided with two ports, said ports being disposed diametrically opposite on said valve-body and differing in length and being separated on opposite sides by equal valve-body portions, said valve-body being rotatable in said housing to close the inlet port or to bring the inlet port into communication with either of said outlet ports of the valve housing and to close the other outlet port, and a stop adapted to limit the rotative movement of the valve.

3. A two-way outlet for plumbing fixtures comprising a mixing chamber provided with an outlet port and valved supply pipes respectively for hot and cold water, a valve housing having an inlet port nipple for coupling the housing to the outlet from said mixing chamber, said valve housing being provided with an outlet disposed in a horizontal plane and with an outlet disposed in a vertical plane, a hollow valve body provided with two ports, said ports being arranged on opposite sides of said valve body and differing in length and being separated on opposite sides by equal valve-body portions, said valve being rotatable in said housing to close the inlet port and bring the outlet ports of said housing into communication through the longer valve body port.

4. A two-way outlet for plumbing fixtures comprising a mixing chamber provided with an outlet port and valved supply pipes respectively for hot and cold water, a valve housing having a conical bore and provided with an inlet nipple for coupling the housing to the outlet from said mixing chamber, said valve housing being also provided with an outlet port disposed in a horizontal plane and with an outlet port disposed in a vertical plane, a hollow conical valve-body rotatable within said housing having two ports, arranged on opposite sides of the body, said ports differing in length and being separated by equal valve body portions and a spring adapted to urge the valve body into the conical bore of the housing.

In witness whereof I have hereunto set my hand this 19th day of April, 1911.

IRVING W. LITTLE.

Witnesses:
 ELMER M. COONEY,
 INEZ SORG.